US009273775B2

(12) United States Patent
Kvarnström

(10) Patent No.: US 9,273,775 B2
(45) Date of Patent: Mar. 1, 2016

(54) SHIFTER ASSEMBLY WITH REDUCED LASH

(71) Applicant: Kongsberg Automotive AB, Mullsjö (SE)

(72) Inventor: Anders Kvarnström, Jönköping (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 345 days.

(21) Appl. No.: 13/803,490

(22) Filed: Mar. 14, 2013

(65) Prior Publication Data
US 2013/0340558 A1   Dec. 26, 2013

(30) Foreign Application Priority Data

Mar. 22, 2012  (EP) .................................... 12160748

(51) Int. Cl.
*F16H 59/04* (2006.01)
*F16H 59/10* (2006.01)
*F16H 59/02* (2006.01)

(52) U.S. Cl.
CPC ................ *F16H 59/04* (2013.01); *F16H 59/02* (2013.01); *F16H 59/044* (2013.01); *F16H 59/105* (2013.01); *F16H 2059/0273* (2013.01); *Y10T 74/20159* (2015.01)

(58) Field of Classification Search
CPC ................... Y10T 74/20018; Y10T 74/20128; Y10T 74/20159; Y10T 74/20165; Y10T 74/20171; Y10T 74/20201; G03G 21/1857; G03G 15/757

USPC ................... 74/473.1, 473.27, 473.28, 473.3, 74/473.33, 473.34, 471 XY, 471 R, 10.9; 384/200, 496, 440; 403/154, 116; 345/161; 463/38

See application file for complete search history.

(56) References Cited

U.S. PATENT DOCUMENTS 1,384,173 A  *  7/1921  Wikander ..................... 384/280
1,557,214 A     10/1925  McClane
(Continued)

FOREIGN PATENT DOCUMENTS

CN   201651263 U   11/2010
DE   3717675 A1   12/1988
(Continued)

OTHER PUBLICATIONS

English language abstract for CN 201651263 extracted from espacenet.com database Apr. 3, 2013, 1 page.
(Continued)

*Primary Examiner* — Terence Boes
(74) *Attorney, Agent, or Firm* — Howard & Howard Attorneys PLLC

(57) ABSTRACT

The subject invention provides for a shifter assembly for selecting one of a plurality of gears of a transmission of a vehicle. The shifter assembly includes a pin engaging a lever and one of a handle and a support and rotatable towards first and second ramps to define a first range of movement between the lever and one of the handle and the support. A first post and a second post extend from the lever. A first bushing is attached to the first post and a second bushing is attached to the second post. A pair of first and second engagement surfaces are disposed on the one of the handle and the support. The first bushing is sandwiched between the pair of first engagement surfaces and the second bushing is sandwiched between the pair of second engagement surfaces to define a second range of movement.

22 Claims, 10 Drawing Sheets

(56) References Cited

U.S. PATENT DOCUMENTS

| | | | |
|---|---|---|---|
| 1,638,182 A * | 8/1927 | Butell | 74/473.23 |
| 1,738,037 A * | 12/1929 | Collins | 384/296 |
| 2,100,642 A * | 11/1937 | Geyer | 74/473.3 |
| 2,295,139 A * | 9/1942 | Topanelian, Jr | 384/222 |
| 2,853,895 A | 9/1958 | Bixby | |
| 2,930,211 A * | 3/1960 | Guy | 464/93 |
| 2,964,964 A * | 12/1960 | Craig | 74/473.33 |
| 3,306,125 A * | 2/1967 | Purcell et al. | 74/471 R |
| 3,513,716 A * | 5/1970 | Evans | 74/473.27 |
| 4,077,275 A * | 3/1978 | Kluge et al. | 74/473.3 |
| 4,333,360 A * | 6/1982 | Simmons | 74/473.34 |
| 4,569,245 A | 2/1986 | Feldt et al. | |
| 4,597,499 A * | 7/1986 | Hanula | 213/50.5 |
| 4,646,582 A * | 3/1987 | Kijima | 74/473.33 |
| 4,790,672 A * | 12/1988 | Komplin | 384/125 |
| 4,849,583 A * | 7/1989 | Meyer | 200/6 A |
| 5,129,687 A * | 7/1992 | Scheidel et al. | 285/273 |
| 5,145,265 A * | 9/1992 | Flem | 384/296 |
| 5,669,718 A * | 9/1997 | Sakairi et al. | 384/220 |
| 5,689,996 A | 11/1997 | Ersoy | |
| 5,802,922 A * | 9/1998 | Kawai et al. | 74/473.1 |
| 5,934,145 A * | 8/1999 | Ersoy et al. | 74/473.18 |
| 6,064,369 A | 5/2000 | Okabe et al. | |
| 6,848,332 B2 * | 2/2005 | Hayashi et al. | 74/473.33 |
| 6,923,083 B2 * | 8/2005 | Fujinuma | 74/473.33 |
| 6,925,903 B2 | 8/2005 | Bunsch et al. | |
| 7,220,056 B2 * | 5/2007 | Kubota et al. | 384/215 |
| 7,246,538 B2 * | 7/2007 | Hermansson | 74/473.28 |
| 8,875,596 B2 * | 11/2014 | Walters et al. | 74/552 |
| 2005/0028634 A1 * | 2/2005 | Giefer et al. | 74/473.33 |
| 2006/0185467 A1 * | 8/2006 | Giefer et al. | 74/532 |
| 2009/0056490 A1 | 3/2009 | Shimizu | |
| 2009/0178504 A1 * | 7/2009 | Bleckmann et al. | 74/473.12 |
| 2010/0116075 A1 * | 5/2010 | Moreno Colom et al. | 74/473.12 |
| 2010/0307277 A1 | 12/2010 | Ueta et al. | |
| 2012/0013487 A1 | 1/2012 | Hsu | |
| 2014/0165768 A1 * | 6/2014 | Fontana | 74/473.33 |
| 2014/0345410 A1 * | 11/2014 | Yamamoto | 74/473.3 |

FOREIGN PATENT DOCUMENTS

| | | |
|---|---|---|
| JP | 2010-173398 | 12/2010 |
| WO | WO 2004/005765 A1 | 1/2004 |

OTHER PUBLICATIONS

English language abstract for DE 3717675 extracted from espacenet.com database Apr. 3, 2013, 1 pages.
English language abstract and computer-generated translation for JP 2010-173398 extracted from PAJ database Apr. 3, 2013, 38 pages.

* cited by examiner

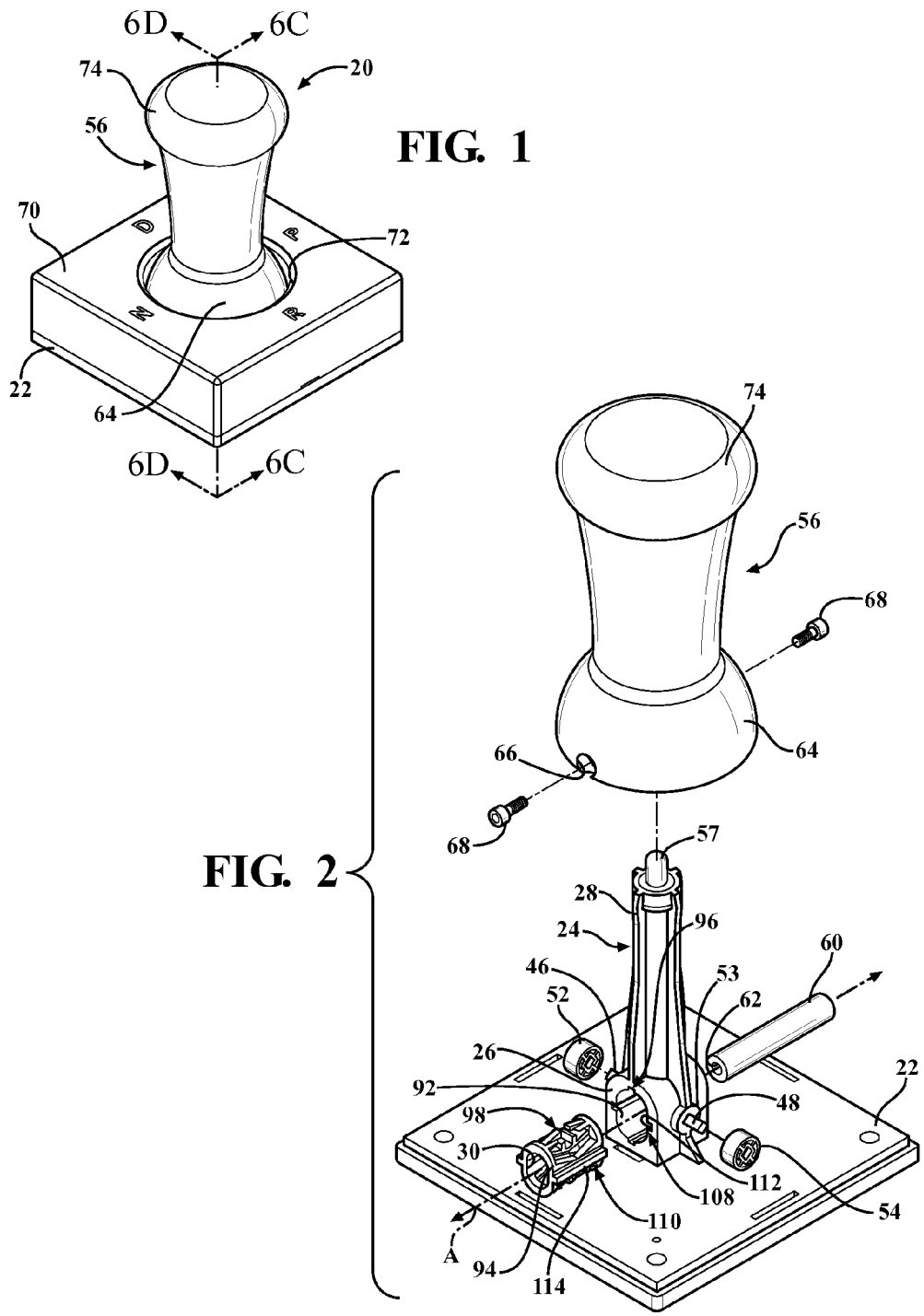

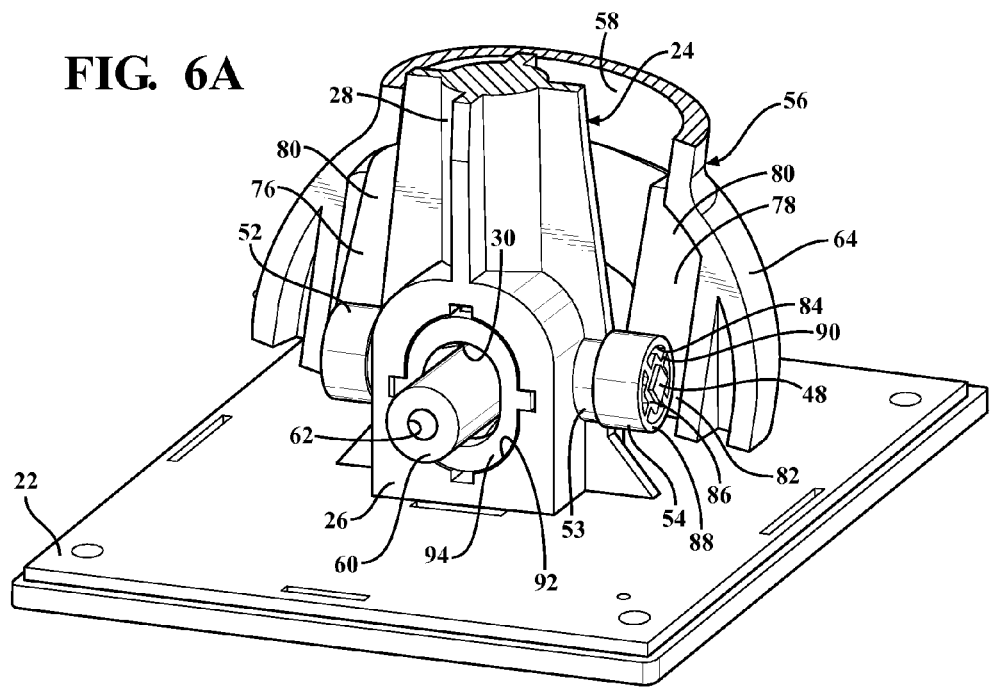
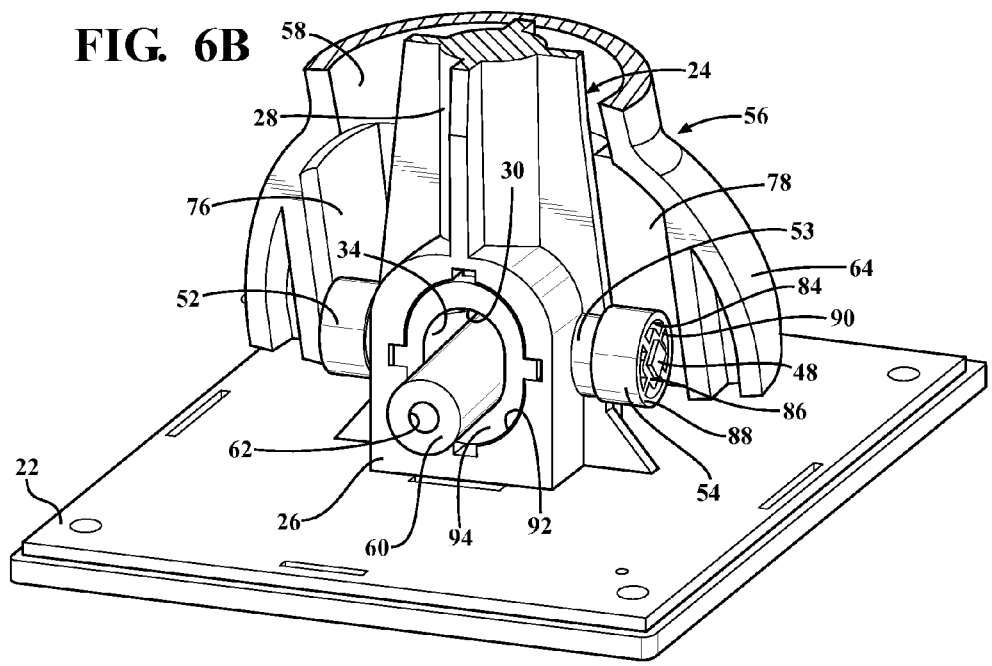

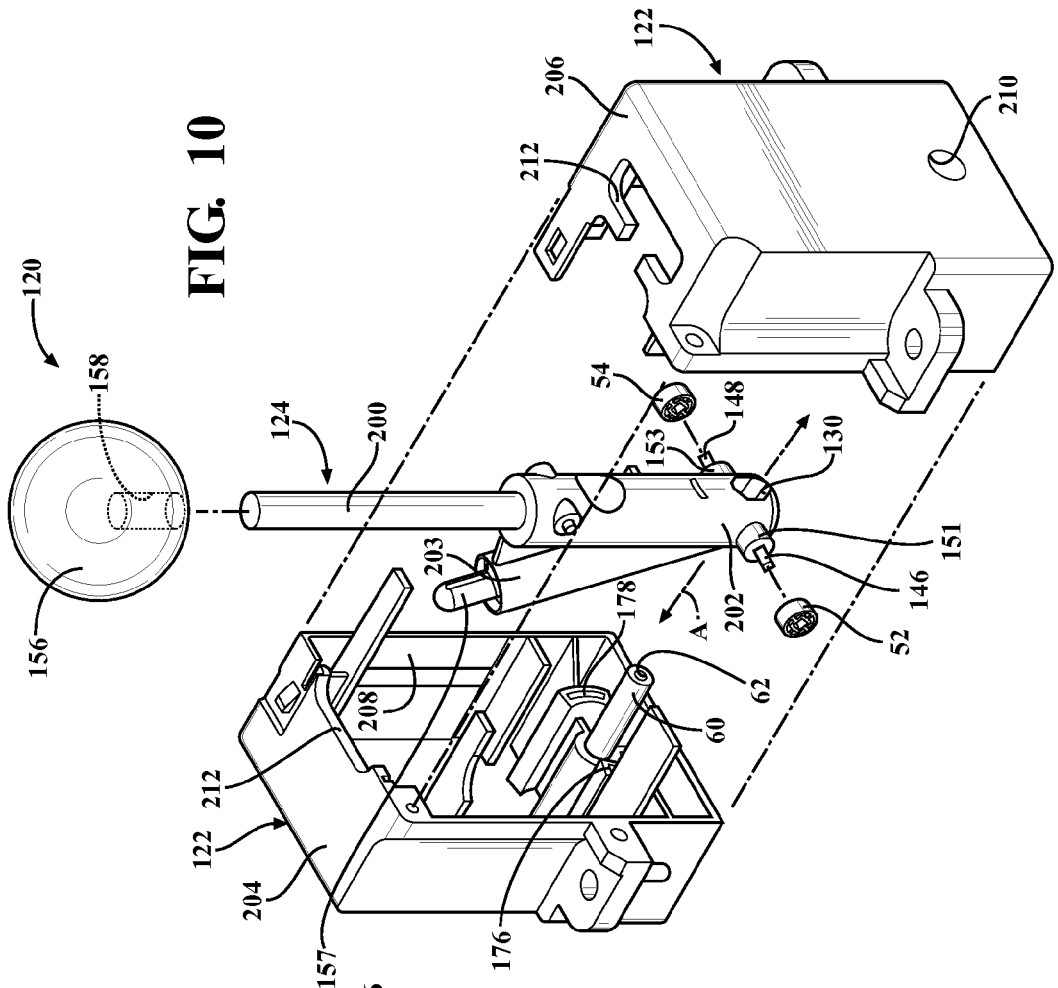

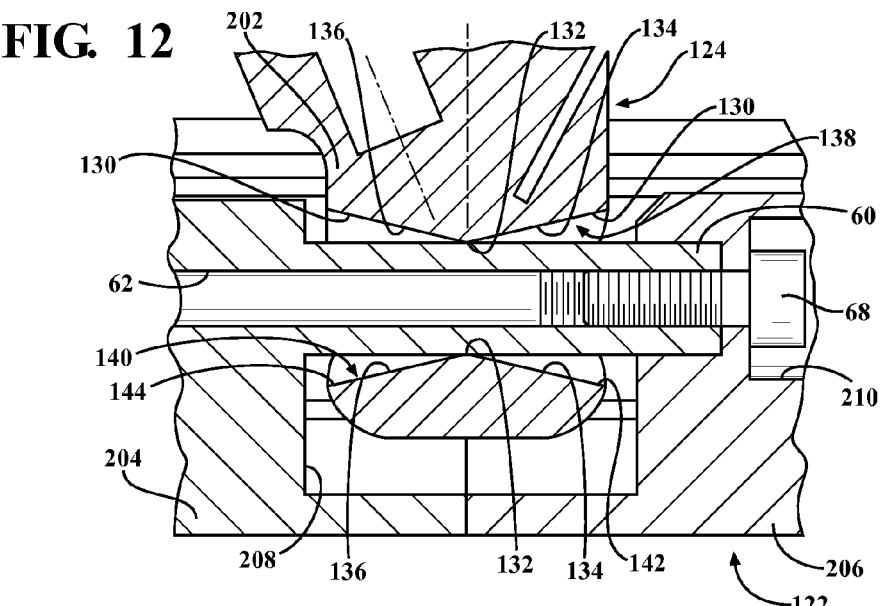
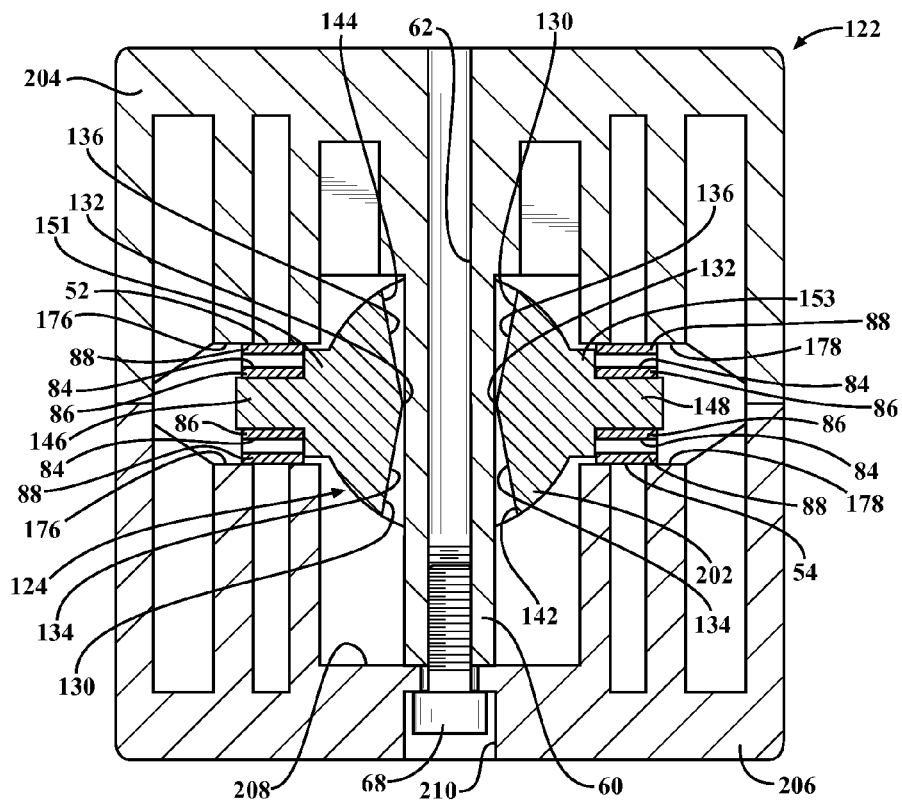

SHIFTER ASSEMBLY WITH REDUCED LASH

RELATED APPLICATION

This application claims priority to and all advantages of European Patent Application No. 12160748, which was filed on Mar. 22, 2012.

BACKGROUND OF THE INVENTION

1. Field of the Invention

The subject invention generally relates to a shifter assembly for selecting one of a plurality of gears of a transmission of a vehicle.

2. Description of Related Art

There is a desire within the industries utilizing shifter assemblies to restrict the range of movement of a shifter within a desired set of parameters. Many techniques have been used to restrict this range of movement. One solution in the industry is disclosed in U.S. Pat. No. 4,569,245 (the '245 patent). Specifically, the '245 patent discloses a shifter having a pivotable shift stick and a lower plate with the shift stick partially disposed within the lower plate. A spherical ball is disposed on the shift stick and a rocking shaft extends through the spherical ball transverse to the shift stick such that the rocking shaft presents first and second ends. Bushings are disposed on the ends of the rocking shaft. The lower plate defines a spherical socket and a channel adjacent to the spherical socket. The bushings on the ends of the rocking shaft are disposed within and slide within the channel, thus there must be a space between the bushings and the channel which could create lash.

Therefore, there remains an opportunity to develop a shifter assembly that reduces lash and more efficiently defines the various ranges of movement of the shifter.

SUMMARY OF THE INVENTION AND ADVANTAGES

The subject invention provides for a shifter assembly for selecting one of a plurality of gears of a transmission of a vehicle. The shifter assembly includes a support and a lever coupled to the support. The lever defines an aperture and an axis extending through the aperture with the lever having a contact surface disposed within said aperture. A first ramp extends angularly from the contact surface and a second ramp extends angularly from the contact surface in an opposite direction from the first ramp. A handle defines an interior. The handle is disposed over at least a portion of the lever. A pin engages the contact surface of the lever and engages one of the handle and the support to partially couple the lever to the one of the handle and the support. The pin is rotatable towards the first and second ramps to define a first range of movement between the lever and one of the handle and the support. A first post and a second post extend from the lever in opposite directions transverse to the axis with each of the first and second posts extending to a distal end. A first bushing is attached to the distal end of the first post and a second bushing is attached to the distal end of the second post. The shifter assembly further includes a pair of first engagement surfaces spaced from each other and a pair of second engagement surfaces spaced from each other. The first and second engagement surfaces are disposed on the one of the handle and the support. The first bushing is sandwiched between the pair of first engagement surfaces and the second bushing is sandwiched between the pair of second engagement surfaces to define a second range of movement and to fully couple the lever to the one of the handle and the support.

Additionally, the subject invention provides for a shifter assembly for selecting one of a plurality of gears of a transmission of a vehicle. The shifter assembly includes a support. A lever is coupled to the support and defines a bore. A handle defines an interior with the handle disposed over at least a portion of the lever. A pin engages one of the handle and the support. The lever further includes a liner mounted within the bore of the lever. The liner defines an aperture and has a contact surface disposed within the aperture. A first ramp extends angularly from the contact surface and a second ramp extends angularly from the contact surface in an opposite direction from the first ramp. The pin engages the contact surface and is rotatable towards the first and second ramps to define a range of movement between the lever and the one of the handle and the support.

Accordingly, the subject invention provides for a shifter assembly that reduces lash between a handle and a support as the handle pivots in a first range of movement and a second range of movement. Furthermore, shifter assembly is modular in design and is easily integrated into the vehicle.

BRIEF DESCRIPTION OF THE DRAWINGS

Advantages of the subject invention will be readily appreciated as the same becomes better understood by reference to the following detailed description when considered in connection with the accompanying drawings.

FIG. 1 is a perspective view of a shifter assembly of a first embodiment.

FIG. 2 is an exploded view of the shifter assembly of the first embodiment with a cover removed.

FIG. 6A is a perspective sectional view with the handle in a rearward position.

FIG. 6B is a perspective sectional view with the handle in a left position.

FIG. 9 is a perspective view of a shifter assembly in accordance with a second embodiment.

FIG. 10 is an exploded view of the shifter assembly of the second embodiment.

FIG. 12 is a cross-sectional view of FIG. 11A along section line 12-12 with the pin disposed within the aperture of the lever and the pin engaging a contact surface.

FIG. 13 is a cross-sectional view of FIG. 11A along section line 13-13 with the pin disposed within the aperture of the lever with first and second posts extending from the lever and bushings disposed on the first and second posts.

DETAILED DESCRIPTION OF THE INVENTION

Referring to the Figures, wherein like numerals indicate like or corresponding parts throughout the several views, a first embodiment of a shifter assembly 20 for selecting one of a plurality of gears of a transmission of a vehicle is generally shown in FIGS. 1 and 2. The shifter assembly 20 can be utilized as a shift-by-wire shifter assembly and a cable operated shifter assembly, as known in the art. However, it is to be appreciated that the shifter assembly 20 can be utilized in any suitable manner to select one of the plurality of gears of the transmission of the vehicle.

Figure 6C:
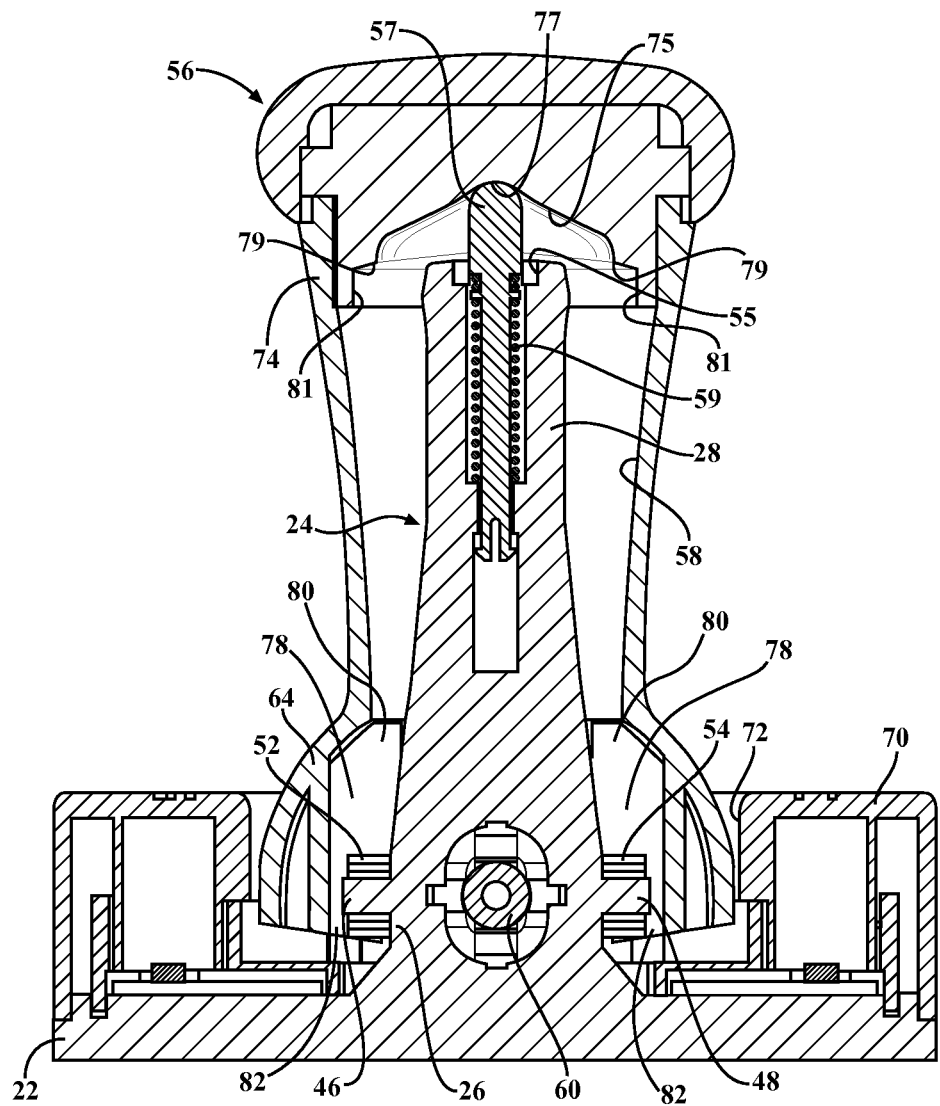
FIG. 6C is a cross-sectional view of FIG. 1 along section line 6C-6C with a plunger engaging a return device and the handle in the intermediate position.
Figure 6D:
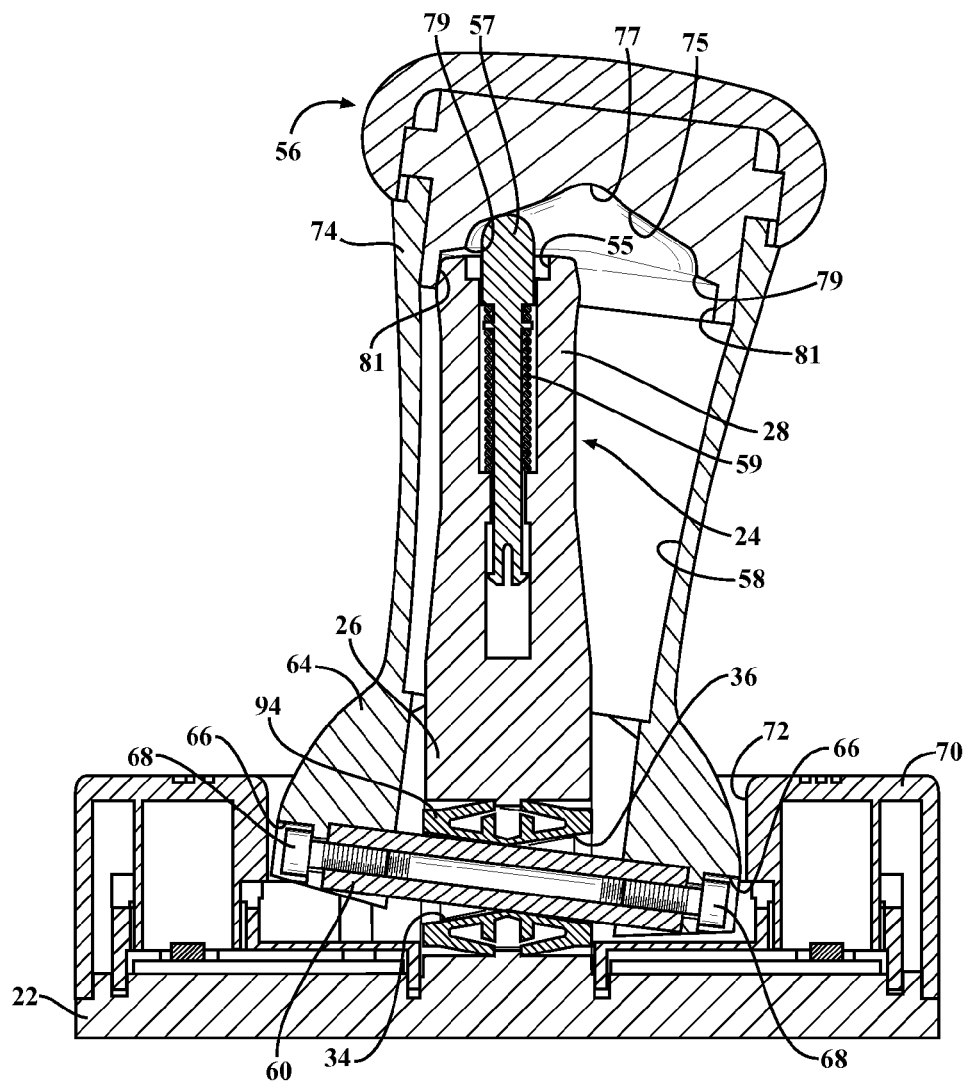
FIG. 6D is a cross-sectional view of FIG. 1 along section line 6D-6D with the plunger engaging the return device and the handle in a right position.

The shifter assembly 20 includes a support 22 secured to the vehicle. The support 22 can be secured to the vehicle by bolts, screws, pins, or any other suitable fasteners. The shifter assembly 20 further includes a lever 24 coupled to the support 22. More specifically, the lever 24 has a base 26 and a rod 28 extending away from the base 26, with the base 26 fixed to the support 22. The base 26 can be secured to the support 22 by bolts, screws, clips, or any other suitable fastener. Moreover, it is to be appreciated that the lever 24 and the support 22 can be one integral component, as shown in FIGS. 6C and 6D.

Figure 5:
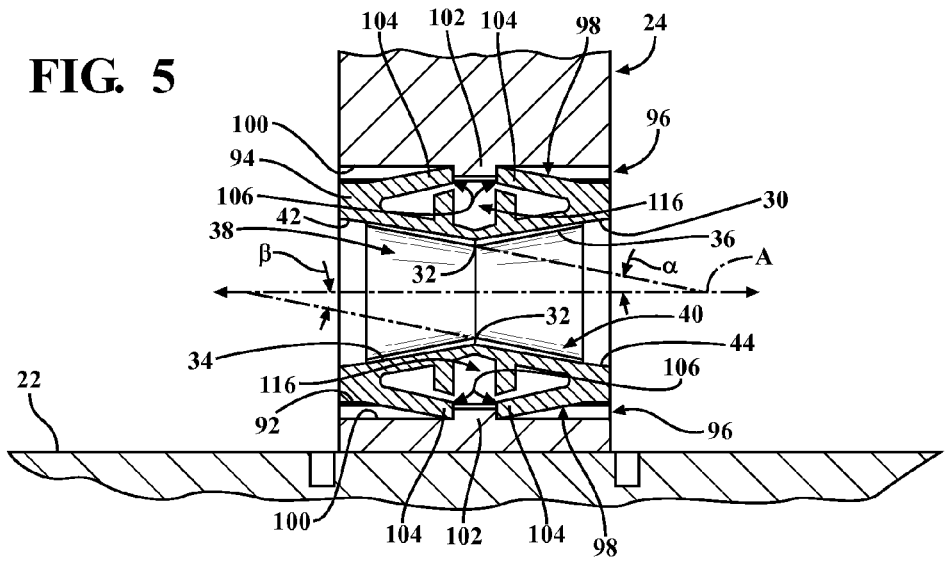
FIG. 5 is a cross-sectional view of FIG. 4 along section line 5-5 with the lever having the liner.
Figures 7, 8:
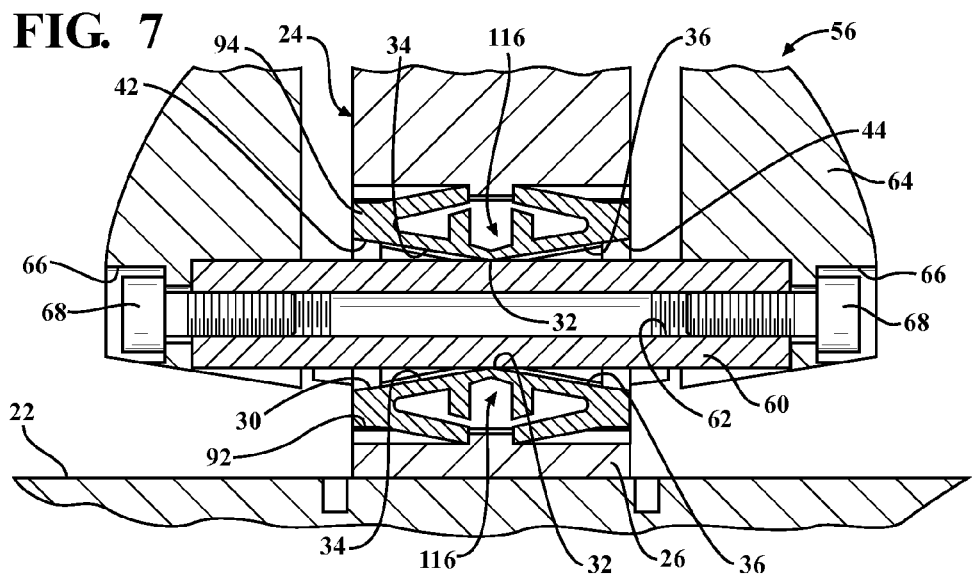
FIG. 7 is a cross-sectional view of FIG. 3A along section line 7-7 with the pin disposed within the aperture of the lever and the pin engaging a contact surface.
FIG. 8 is a cross-sectional view of FIG. 3A along section line 8-8 with the pin disposed within the aperture of the lever with first and second posts extending from the lever and bushings disposed on the first and second posts.

As shown in FIGS. 5 and 7, the lever 24 defines an aperture 30 and an axis A with the axis A extending through the aperture 30. Furthermore, the lever 24 has a contact surface 32 disposed within the aperture 30. More specifically, the contact surface 32 is disposed at a central position within the aperture 30 of the lever 24. A first ramp 34 extends angularly from the contact surface 32 and a second ramp 36 extends angularly from the contact surface 32 in an opposite direction from the first ramp 34. More specifically, the first and second ramps 34, 36 extend angularly away from the axis A. As a result, the first ramp 34 and the axis A form a first angle α and the second ramp 36 and the axis A form a second angle β with the first angle α substantially equal to the second angle β. Furthermore, the first and second ramps 34, 36 are mirror images of each other. It is to be appreciated that the ramps 34, 36 can be any suitable configuration. In addition, the aperture 30 is divided into a first portion 38 between the axis A and extending upwardly towards the rod 28 of the lever 24, and a second portion 40 between the axis A and extending downwardly towards the support 22.

Figure 3A:
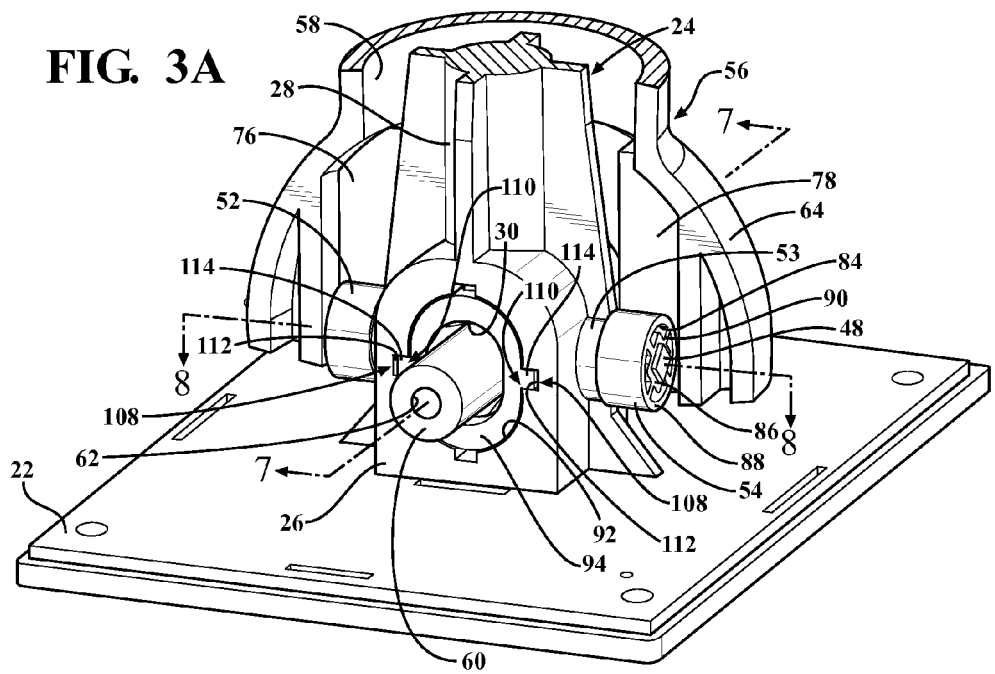
FIG. 3A is a perspective sectional view with a lever defining a bore and a liner defining an aperture disposed in the bore with a handle in an intermediate position, and with the cover removed.
Figure 3B:
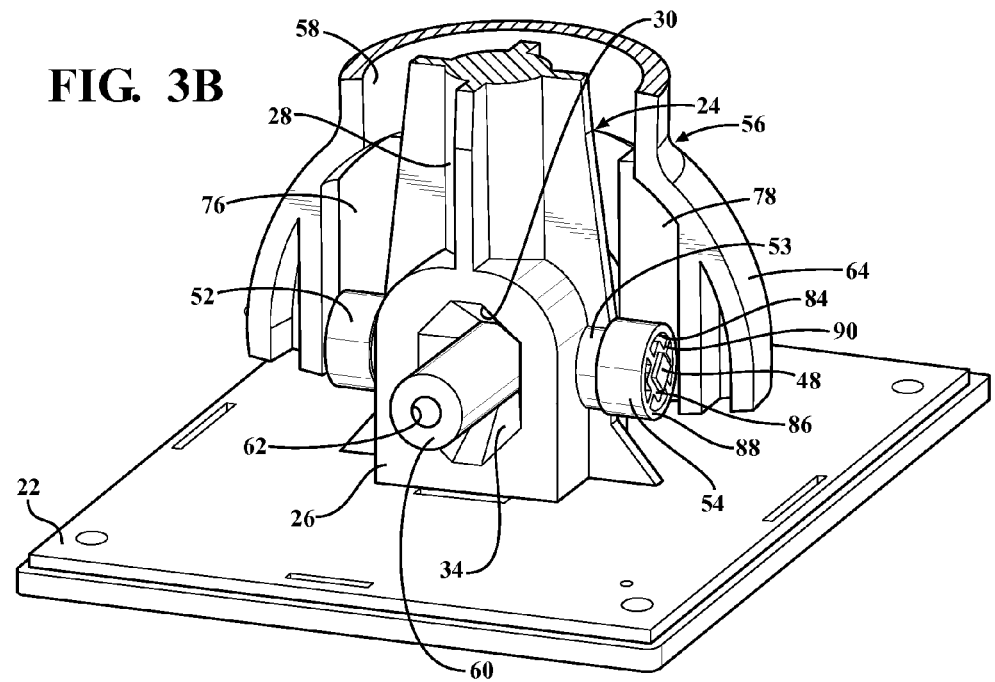
FIG. 3B is a perspective sectional view with the lever defining the aperture and a handle in the intermediate position with the cover removed.

The aperture 30 is further defined as having a first terminal end 42 and a second terminal end 44. The first and second ramps 34, 36 extend angularly from the contact surface 32 to the first and second terminal ends 42, 44 along the axis A, respectively. The ramps 34, 36 radially surround the axis A in one of a substantially arcuate configuration and a substantially angular configuration. More specifically, in the substantially arcuate configuration, the first and second ramps 34, 36 follow a substantially curved path around the axis A, as shown in FIG. 3A. In the substantially angular configuration, the first and second ramps 34, 36 follow a path around the axis A that is polygonal in configuration, as shown in FIG. 3B. The polygonal configuration is further defined as an octagonal configuration in the illustrated embodiment. It is to be appreciated that the ramps 34, 36 can radially surround the axis A in any other suitable configuration.

As shown in FIG. 2, a first post 46 and a second post 48 extend from the lever 24 in opposite directions transverse to the axis A with each of the first and second posts 46, 48 extending to a distal end 50. More specifically, the lever 24 includes a first shoulder 51 and a second shoulder 53 with the first and second posts 46, 48 extending from the first and second shoulders 51, 53, respectively, as shown in FIGS. 2-4, 6A, 6B, and 8. Furthermore, a first bushing 52 is attached to the distal end 50 of the first post 46 and a second bushing 54 is attached to the distal end 50 of the second post 48. The first and second shoulders 51, 53 and the first and second bushings 52, 54 are substantially cylindrical in configuration. Furthermore, the first and second shoulders 51, 53 and the first and second bushings 52, 54 have a diameter with diameter of the first and second shoulders 51, 53 less than the diameter of the first and second bushings 52, 54, as shown in FIG. 8. The first and second posts 46, 48 define a square configuration extending from the lever 24. However, it is to be appreciated that the first and second posts 46, 48 may be a circle configuration or any other suitable configuration for coupling the first and second bushings 52, 54 to the lever 24. It is to be appreciated that in another embodiment the first and second posts 46, 48 and first and second bushings 52, 54 can be further defined as just one post and just one bushing. Furthermore, it is to be appreciated that in yet another embodiment the first and second posts 46, 48 and first and second bushings 52, 54 can be further defined as greater than two posts 46, 48 and greater than two bushings 52, 54.

As shown in FIGS. 6C and 6D, the rod 28 of the lever 24 extends away from the base 26 towards a distal end. The rod 28 further defines an orifice 55 at the distal end with a plunger 57 and a biasing member 29 disposed within the orifice 55. More specifically, the biasing member 59 is completely disposed within the orifice 55 and the plunger 57 is partially disposed within the orifice 55. The biasing member 59 and the plunger 57 abut each other, such that the biasing member 59 biases the plunger 57 away from the base 26 of the lever 24.

The shifter assembly 20 further includes a handle 56 defining an interior 58 with the handle 56 disposed over at least a portion of the lever 24, as shown in FIGS. 3A and 3B. More specifically, the rod 28 and part of the base 26 of the lever 24 are disposed within the interior 58 of the handle 56.

As shown in FIG. 7, a pin 60 is disposed within the aperture 30 of the lever 24. More specifically, the pin 60 engages the contact surface 32 of the lever 24 and engages one of the handle 56 and the support 22 to partially couple the lever 24 to the one of the handle 56 and the support 22. In this embodiment, the pin 60 engages the handle 56. However, it is to be appreciated that the pin 60 can engage the support 22, as discussed below, in other embodiments.

Furthermore, the pin 60 defines a hole 62 extending through the pin 60. The handle 56 includes a lower portion 64 that defines a pair of openings 66 coaxial with the hole 62 for receiving a fastener 68 to secure the handle 56 to the pin 60. It is to be appreciated the fastener 68 can be any one of a bolt, screw, etc. The openings 66 are disposed on opposite sides of the lower portion 64 of the handle 56. Each of the openings 66 further define a counter-bore configuration for completely disposing the fastener 68 therein. Moreover, the each of the fasteners 68 extend through each of the openings 66 into the hole 62 of the pin 60 to secure the handle 56 to the pin 60.

A cover 70 is fixed to the support 22 by bolts, screws, pins, or any other suitable fasteners, as shown in FIG. 1. The cover 70 defines a cover opening 72 within which the lever 24 and the handle 56 are disposed. More specifically, the cover 70 partially encompasses the base 26 of the lever 24 and the lower portion 64 of the handle 56 such that the lever 24 and handle 56 project through the cover opening 72. As such, an upper portion 74 of the handle 56 adjacent to the lower portion 64 of the handle 56 is disposed outside the cover 70 to allow communication with a user.

The handle 56 further includes a return device 75 disposed within the interior 58 of the handle 56, as shown in FIGS. 6C and 6D. More specifically, the return device 75 is disposed in the upper portion 74 of the handle 56. The return device 75 is substantially conical in configuration, with the return device 75 having an apex 77 and a base edge 79. The upper portion 74 of the handle 56 further includes an end-stop surface 81 adjacent to the base edge 79 of the return device 75. Furthermore, the plunger 57 of the lever 24 engages the return device 75. More specifically, the plunger 57 selectively engages the apex 77 and the area of the return device 75 between the apex 77 and the base edge 79. Engagement of the plunger 57 and the return device 75 will be described in greater detail below.

As shown in FIGS. 3A and 3B, the shifter assembly 20 further includes a pair of first engagement surfaces 76 spaced from each other and a pair of second engagement surfaces 78 spaced from each other with the first and second engagement surfaces 76, 78 disposed on the one of the handle 56 and the support 22. In this embodiment, the first and second engagement surfaces 76, 78 are disposed on the handle 56. However, it is to be appreciated that the first and second engagement surfaces 76, 78 can be disposed on the support 22, as discussed below, in other embodiments. The pair of first and second engagement surfaces 76, 78 are disposed within the interior 58 of the handle 56 and are positioned such that the pair of first and second engagement surfaces 76, 78 are disposed on opposite sides of the interior 58 of the handle 56. Furthermore, the pair of first and second engagement surfaces 76, 78 are transverse to the pair of openings 66 of the lower portion 64 of the handle 56.

Figure 11A:
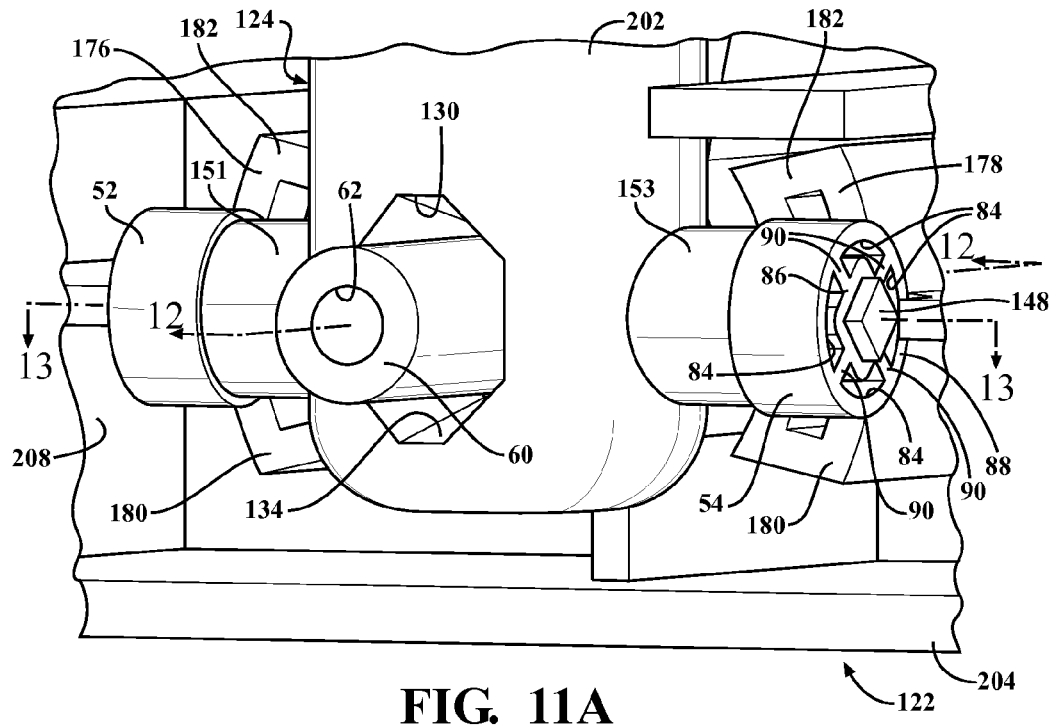
FIG. 11A is a fragmented perspective view with a lever defining an aperture and in an intermediate position.
Figure 11B:
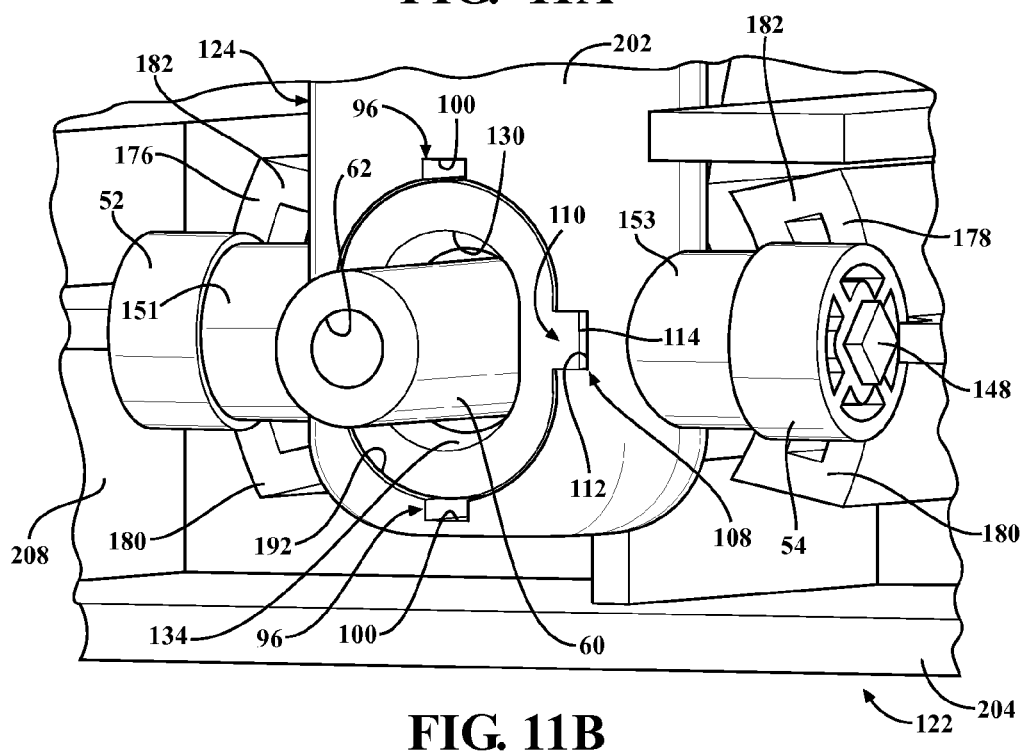
FIG. 11B is a fragmented perspective view with the lever defining a bore and a liner defining the aperture disposed in the bore with the lever in the intermediate position.

Each of the pair of first and second engagement surfaces 76, 78 have a first end 80 and a second end 82, as best shown in FIG. 6A. The first ends 80 of the pair of first and second engagement surfaces 76, 78 are disposed toward the upper portion 74 of the handle 56 and the second ends 82 of the pair of first and second engagement surfaces 76, 78 are disposed toward the lower portion 64 of the handle 56. Furthermore, each of the pair of first engagement surfaces 76 are substantially parallel to each other and each of the pair of second engagement surfaces 78 are substantially parallel to each other. In addition, the pair of first and second engagement surfaces 76, 78 are one of a linear configuration and a curvilinear configuration. More specifically, in the linear configuration, each of the pair of first and second engagement surfaces 76, 78 follow a linear path between the first end 80 and the second end 82, as shown in FIGS. 6A and 6B. In the curvilinear configuration, the pair of first and second engagement surfaces 76, 78 follow a curvilinear path between the first end 80 and the second end 82 that apexes away from the lever 24, as shown in FIGS. 11A and 11B. In this embodiment as shown in FIGS. 3A, 3B, 6A, and 6B, the pair of first and second engagement surfaces 76, 78 are the linear configuration. However, it is to be appreciated that the pair of first and second engagement surfaces 76, 78 can be any other suitable configuration.

As best shown in FIG. 8, the first bushing 52 is sandwiched between the pair of first engagement surfaces 76 and the second bushing 54 is sandwiched between the pair of second engagement surfaces 78. More specifically, the first bushing 52 is disposed between and abuts each of the pair of first engagement surfaces 76. Similarly, the second bushing 54 is disposed between and abuts each of the pair of second engagement surfaces 78.

Figure 4:
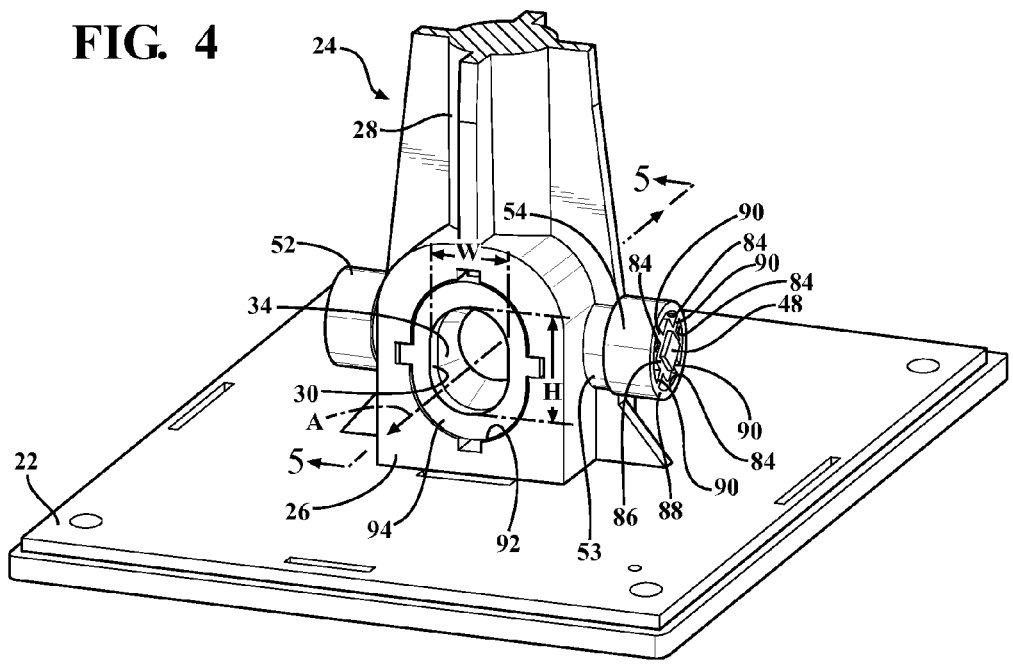
FIG. 4 is a perspective sectional view with the lever defining the bore and the liner defining the aperture disposed in the bore with the handle, pin, and cover removed.

In the embodiment illustrated, each of the first and second bushings 52, 54 include at least one void 84 such that the first bushing 52 at least partially deforms when sandwiched between the pair of first engagement surfaces 76 and the second bushing 54 at least partially deforms when sandwiched between the pair of second engagement surfaces 78 to reduce lash between the lever 24 and the one of the handle 56 and the support 22, as shown in FIGS. 4 and 8. More specifically, each of the first and second bushings 52, 54 include a hub 86 to couple the first and second bushings 52, 54 to the respective first and second posts 46, 48. An outer ring 88 is spaced from and surrounds the hub 86 to engage the pair of first and second engagement surfaces 76, 78. A plurality of spokes 90 project radially from the hub 86 to the outer ring 88 to couple the outer ring 88 to the hub 86. The at least one void 84 is defined between the hub 86 and the outer ring 88. Furthermore, the at least one void 84 is further defined as a plurality of voids 84 with one of the voids 84 disposed between two of the spokes 90. More specifically, the spokes 90 are juxtaposed to the voids 84 such that the spokes 90 and the voids 84 alternate radially about the hub 86. When the first and second bushings 52, 54 are sandwiched between the pair of first and second engagement surfaces 76, 78, respectively, the at least one void 84 allows at least one of the outer ring 88 and the spokes 90 to at least partially deform. Deformation of the first and second bushings 52, 54 reduces lash between the handle 56 and the lever 24.

As shown in FIG. 8, the first shoulder 51 of the lever 24 is disposed between the pair of first engagement surfaces 76 of the handle 56 and the second shoulder 53 of the lever 24 is disposed between the pair of second engagement surfaces 78 of the handle 56. Under nominal deformation of the first and second bushings 52, 54, the first and second shoulders 51, 53 do not engage any one of the pair of first and second engagement surfaces 76, 78. When an excess load is exerted on the handle 56, the first and second bushings 52, 54 deform further until any one of the first and second shoulders 51, 53 engage any one of the pair of first and second engagement surfaces 76, 78, respectively. Engagement of the first and second shoulders 51, 53 with the pair of first and second engagement surfaces 76, 78, respectively, ensures that the first and second bushings 52, 54 do not continue to deform until any one of the bushings 52, 54 break or undergo, as it is known in the art, plastic deformation. Prevention of the breakage or plastic deformation of the first and second bushings 52, 54 ensures the function and longevity of the bushings 52, 54.

As best illustrated in FIG. 6B, the pin 60 is rotatable towards the first and second ramps 34, 36 to define a first range of movement between the lever 24 and one of the handle 56 and the support 22. In this embodiment, the first range of movement is between the lever 24 and the handle 56. However, it is to be appreciated that the first range of movement can be between the lever 24 and the support 22, as discussed below, in other embodiments. The first range of movement is further defined as the handle 56 pivoting relative to the support 22 to a left position and a right position.

When the handle 56 pivots to the left position, the pin 60 rotates towards the first ramp 34 in the second portion 40 of the aperture 30 of the lever 24 and concurrently rotates towards the second ramp 36 in the first portion 38 of the aperture 30. When the handle 56 pivots to the right position, the pin 60 rotates towards the first ramp 34 in the first portion 38 of the aperture 30 of the lever 24 and concurrently rotates towards the second ramp 36 in the second portion 40 of the aperture 30.

In the substantially arcuate configuration of the first and second ramps 34, 36 as shown in FIGS. 3A, 4, 6A, and 6B, the pin 60 has a diameter D and the terminal ends 42, 44 of the aperture 30 have a width W and a height H with the height H greater than or equal to the width W. More specifically, the width W is further defined as either one of the distance between the two opposing sides of the first terminal end 42 perpendicular to the axis A and the distance between the two opposing sides of the second terminal end 44 perpendicular to the axis A, along a horizontal plane defined by the axis A and the first and second posts 46, 48. For illustrative purposes, the plane of the cross-section shown in FIG. 8 is the same as the horizontal plane. As mentioned above, the first and second ramps 34, 36 extend angularly from the contact surface 32 to the first and second terminal ends 42, 44 along the axis A, respectively. Furthermore, the first and second ramps 34, 36 are mirror images of each other. As such, the width W of the first terminal end 42 is equal to the width W of the second terminal end 44.

The width W is transverse to the height H and both the width W and the height H are transverse to the axis A of the lever 24. As such, the height H is further defined as either one of the distance between the two opposing sides of the first terminal end 42 perpendicular to the axis A and the distance between the two opposing sides of the second terminal end 44 perpendicular to the axis A, along a vertical plane defined by the axis A and extending perpendicular to the horizontal plane. For illustrative purposes, the plane of the cross-section shown in FIG. 7 is the same as the vertical plane. As mentioned above, the first and second ramps 34, 36 are mirror images of each other. As such, the height H of the first terminal end 42 is equal to the height H of the second terminal end 44. It is to be appreciated that the width W could also be defined as one of the distance between the two opposing sides of the first ramp 34 perpendicular to the axis A and the distance between each of the two opposing sides of the second ramp 36 perpendicular to the axis A, along the horizontal plane. Moreover, the height H could also be defined as one of the distance between the two opposing sides of the first ramp 34 perpendicular to the axis A and the distance between each of the two opposing sides of the second ramp 36 perpendicular to the axis A, along the vertical plane.

The width W of the aperture 30 is substantially equal to the diameter D of the pin 60 such that the pin 60 only pivots along the height H during the first range of movement to reduce lash in the first range of movement between the lever 24 and the one of the handle 56 and the support 22. In this embodiment, lash is reduced between the lever 24 and the handle 56. However, it is to be appreciated that lash can be reduced between the lever 24 and the support 22, as discussed below, in other embodiments.

The first range of movement is further defined as one of relative rotation between the first and second posts 46, 48 and the first and second bushings 52, 54, respectively, and relative rotation between the first and second bushings 52, 54 and the pair of first and second engagement surfaces 76, 78, respectively, as the handle 56 pivots between the left and right positions. Moreover, as the handle 56 pivots between the left and right positions, the first and second bushings 52, 54 do not translate along the elongated pair of first and second engagement surfaces 76, 78. The square configuration of the first and second posts 46, 48 inhibits relative rotation between the first and second posts 46, 48 and the first and second bushings 52, 54, respectively. As such, relative rotation occurs between the first bushing 52 and the pair of first engagement surfaces 76 and between the second bushing 54 and the pair of second engagement surfaces 78. It is to be appreciated that in another embodiment in which the first and second posts 46, 48 are in the circle configuration, the first bushing 52 remains stationary between the pair of first engagement surfaces 76 while rotating relative to first post 46 and the second bushing 54 remains stationary between the pair of second engagement surfaces 78 while rotating relative to the second post 48.

As best illustrated in FIG. 6A, the sandwiching of the first bushing 52 between the pair of first engagement surfaces 76 and the sandwiching of the second bushing 54 between the pair of second engagement surfaces 78 defines a second range of movement and fully couples the lever 24 to the one of the handle 56 and the support 22. In this embodiment, the lever 24 is fully coupled to the handle 56. However, it is to be appreciated that the lever 24 can be fully coupled to the support 22, as discussed below, in other embodiments. The second range of movement is further defined as the handle 56 pivoting relative to the support 22 to a forward position and a rearward position. Moreover, the second range of movement is transverse to the first range of movement. More specifically, the second range of movement is perpendicular to the first range of movement. It is to be appreciated that the forward, rearward, left, and right positions can be any suitable configuration in which the second range of movement is transverse to the first range of movement.

Each of the pair of first and second engagement surfaces 76, 78 are elongated. As a result, the first and second bushings 52, 54 translate along the pair of first and second engagement surfaces 76, 78, respectively, during the second range of movement. More specifically, the first bushing 52 moves towards the first end 80 of the pair of first engagement surfaces 76 and the second bushing 54 moves towards the second end 82 of the pair of second engagement surfaces 78 when the handle 56 is pivoted to the forward position during the second range of movement. Similarly, the first bushing 52 moves towards the second end 82 of the pair of first engagement surfaces 76 and the second bushing 54 moves towards the first end 80 of the pair of second engagement surfaces 78 when the handle 56 is pivoted to the rearward position during the second range of movement.

The second range of movement is further defined as relative rotation between the pin 60 and the lever 24. More specifically, as the handle 56 pivots to one of the forward and rearward positions, the pin 60 rotates with the handle 56 such that the pin 60 pivots within the aperture 30 relative the lever 24. It is to be appreciated that in another embodiment relative rotation can occur between the pin 60 and the handle 56. More specifically, the handle 56 rotates about the pin 60 while the pin 60 remains stationary within the aperture 30 of the lever 24.

As mentioned above, the base 26 of the lever 24 is fixed to the support 22. As such, the handle 56 pivots to any one of the forward, rearward, left, and right positions relative to the lever 24. More specifically, the handle is initially positioned in an intermediate position between the left and right positions and the forward and rearward positions, as shown in FIGS. 3A and 3B. Furthermore, in this embodiment the handle is biased to the intermediate position. However, it is appreciated that the handle could lack a bias to the intermediate position. Each of the forward, rearward, left, and right positions correspond to one of the plurality of gears of the transmission of the vehicle. More specifically, the forward position corresponds to a "Drive" gear of the transmission. The reverse position corresponds to a "Reverse" gear of the transmission. The left position corresponds to a "Neutral" gear of the transmission.

The right position corresponds to a "Park" gear of the transmission. It is to be appreciated that any one of the forward, rearward, left, and right positions can correspond to any one of the "Drive," "Reverse," "Neutral," and "Park" gears of the transmission.

Furthermore, it is to be appreciated that the handle 56 of the shifter assembly 20 can be pivoted to any position between the forward, rearward, left, and right positions. More specifically, the handle 56 can pivot to a resultant position disposed within the angles between the forward and right positions, the right and rearward positions, the rearward and left positions, and the left and forward positions. When pivoted to the resultant position, the handle 56 pivots relative to the lever 24 in a combination of the first and second range of movements.

As mentioned above, the plunger 57 of the lever 24 engages the return device 75 of the handle 56, as shown in FIGS. 6C and 6D. More specifically, the plunger 57 engages the apex 77 when the handle 56 is in the intermediate position, as shown in FIG. 6C. The plunger 57 engages the return device 75 proximate the base edge 79 when the handle 56 is pivoted to any one of the forward, rearward, left, right, and resultant positions, as shown in FIG. 6D. Moreover, the end-stop surface 81 of the handle 56 engages the lever 24 such that the engagement inhibits further movement of the handle 56 as the handle 56 pivots to any one of the forward, rearward, left, right, and resultant positions. When the user releases the handle 56, the bias exerted by the biasing member 59 of the lever 24 on the plunger 57 causes the plunger 57 to translate away from the base 26 of the lever 24. The angularity of the conical configuration of the return device 75 causes the handle 56 to concurrently pivot towards intermediate position as the plunger 57 moves along the return device 75 away from the base edge 79 towards the apex 77.

As previously mentioned, the return device 75 is substantially conical in configuration. However, it is to be appreciated that the return device 75 can be any suitable configuration. As non-limiting examples, the return device 75 can include channels to further define a path along which the handle 56 can pivot in the first and second range of movements. Furthermore, the return device 75 can include detents to provide a haptic feedback to the user as the handle 56 is pivoted. The haptic feedback can be used to indicate changing the gear of the transmission of the vehicle.

In a preferred alternative shown in FIG. 3A, the lever 24 defines a bore 92 with the lever 24 further including a liner 94 mounted within the bore 92 of the lever 24. The bore 92 extends through the lever 24 along the axis A. The liner 94 in turn defines the aperture 30 instead of the lever 24 defining the aperture 30. Furthermore, the liner 94 has the contact surface 32 disposed within the aperture 30. More specifically, the contact surface 32 is disposed at the central position within the aperture 30 of the liner 94, as shown in FIG. 5. As mentioned above, the first ramp 34 extends angularly from the contact surface 32 and the second ramp 36 extends angularly from the contact surface 32 in an opposite direction from the first ramp 34. More specifically, the first and second ramps 34, 36 extend angularly away from the axis A. As a result, the first ramp 34 and the axis A form the first angle α and the second ramp 36 and the axis A form the second angle β with the first angle α substantially equal to the second angle β. Furthermore, the first and second ramps 34, 36 are minor images of each other. It is to be appreciated that the ramps 34, 36 can be any suitable configuration. In addition, the aperture 30 is divided into the first portion 38 between the axis A and extending upwardly towards the rod 28 of the lever 24, and the second portion 40 between the axis A and extending downwardly towards the support 22.

The pin 60 engages the contact surface 32 and is rotatable towards the first and second ramps 34, 36 to define a range of movement between the lever 24 and the one of the handle 56 and the support 22, as shown in FIG. 6B. In this embodiment, the range of movement is between the lever 24 and the handle 56. However, it is to be appreciated that the first range of movement can be between the lever 24 and the support 22, as discussed below, in other embodiments. It is to be appreciated that the range of movement is equivalent to the aforementioned first range of movement.

The lever 24 further includes a first retaining feature 96 and the liner 94 includes a second retaining feature 98. The first and second retaining features 96, 98 engage each other to couple the liner 94 to the lever 24, as shown in FIG. 5. The first retaining feature 96 of the lever 24 is further defined as at least one channel 100 adjacent to the bore 92 with a stud 102 disposed within the channel 100. More specifically, the stud 102 is disposed at a middle position within the channel 100. The second retaining feature 98 of the liner 94 is further defined as at least one pair of flanges 104 disposed on the liner 94. The pair of flanges 104 are disposed within the channel 100 of the lever 24. Furthermore, the pair of flanges 104 define a gap 106 to dispose the stud 102 in the gap 106 and sandwich the stud 102 between the pair of flanges 104.

The at least one channel 100 is further defined as a pair of channels 100 disposed opposite each other and adjacent to the bore 92. Furthermore, the at least one pair of flanges 104 is further defined as two pair of flanges 104 disposed opposite each other on the liner 94 such that the pair of flanges 104 of the liner 94 correspond to the channel 100 of the lever 24. It is to be appreciated that that the first and second retaining features 96, 98 can be any suitable configuration to couple the liner 94 to the lever 24.

The lever 24 has a first anti-rotation feature 108 and the liner 94 has a second anti-rotation feature 110 with the first and second anti-rotation features 108, 110 engaging each other to prevent rotation of the liner 94 within the bore 92 of the lever 24, as shown in FIGS. 3A and 8. More specifically, the first anti-rotation feature 108 of the lever 24 is further defined as at least one recess 112 adjacent to the bore 92 and the second anti-rotation feature 110 of the liner 94 is further defined as at least one tab 114 extending away from the liner 94 with the tab 114 disposed within the recess 112. The at least one recess 112 is further defined as two recesses 112 disposed opposite each other and adjacent to the bore 92. Moreover, the recesses 112 are transverse to the channels 100 of the first retaining feature 96 of the lever 24. Furthermore, the at least one tab 114 is further defined as two tabs 114 disposed opposite each other on the liner 94 such that the tabs 114 of the liner 94 correspond to the recesses 112 of the lever 24. It is to be appreciated that the first and second anti-rotation features 108, 110 can be any suitable configuration to prevent rotation of the liner 94 within the bore 92 of the lever 24.

The pin 60 radially displaces the contact surface 32 of the liner 94 to reduce lash between the pin 60 and the liner 94. More specifically, the liner 94 defines a cavity 116 adjacent the contact surface 32 to facilitate displacement of the contact surface 32, as shown in FIG. 7. Furthermore, the cavity 116 is further defined as a pair of cavities 116 disposed on the liner 94 opposite each other and adjacent to the contact surface 32 of the liner 94. More specifically, each of cavities 116 are disposed proximate to one of the pair of flanges 104 of the second retaining feature 98 of the liner 94.

As previously mentioned, the ramps 34, 36 radially surround the axis A in one of the substantially arcuate configuration and the substantially angular configuration. In this alternative as shown in FIG. 3A, the ramps 34, 36 surround the axis A in the substantially arcuate configuration. However, it is to be appreciated that the ramps 34, 36 can radially surround the axis A in the substantially angular configuration or any other suitable configuration.

It is to be appreciated that in another alternative, the aperture 30 is defined explicitly by the lever 24. In other words, the lever 24 lacks the bore 92 into which the liner 94 is inserted. In this alternative as shown in FIG. 3B, the ramps 34, 36 surround the axis A in the substantially angular configuration. However, it is to be appreciated that the ramps 34, 36 can radially surround the axis A in the substantially arcuate configuration or any other suitable configuration.

Referring to FIGS. 9 and 10, a second embodiment of a shifter assembly 120 for selecting one of a plurality of gears of a transmission of a vehicle, wherein like reference numerals increased by 100 indicate corresponding parts throughout the several views, is generally shown. Identical components discussed in the first embodiment of the assembly 20 have the same reference numerals in this embodiment and additional components of this embodiment have new reference numerals. In this embodiment of the assembly 120 and as similarly discussed in the first embodiment of the assembly 20, the first and second bushings 52, 54, the pin 60, and the liner 94 through which the pin 60 is disposed are utilized for the reduction of lash in the shifter assembly 120.

The primary distinction between the first embodiment of the assembly 20 and this embodiment of the assembly 120 is the lever 24 fixed to the support 22 having the handle 56 pivotable relative to the support 22 and the lever 24 in assembly 20 is replaced with a lever 124, a handle 156, and a support 122 with the handle 156 and the lever 124 fixed to each other and pivotable relative to the support 122 in the assembly 120.

The shifter assembly 120 can be utilized as a shift-by-wire shifter assembly and a cable operated shifter assembly, as known in the art. However, it is to be appreciated that the shifter assembly 120 can be utilized in any suitable manner to select one of the plurality of gears of the transmission of the vehicle.

The lever 124, having a top end 200 and a bottom end 202, defines an aperture 130 and an axis A, with the axis A extending through the aperture 130. More specifically, the aperture 130 is disposed at the bottom end 202 of the lever 124. The lever 124 has a contact surface 132 disposed within the aperture 130, as shown in FIG. 13. More specifically, the contact surface 132 is disposed at a central position within the aperture 130 of the lever 124. A first ramp 134 extends angularly from the contact surface 132 and a second ramp 136 extends angularly from the contact surface 132 in an opposite direction from the first ramp 134. More specifically, the first and second ramps 134, 136 extend angularly away from the axis A. As a result, the first ramp 134 and the axis A form a first angle α and the second ramp 136 and the axis A form a second angle β with the first angle α substantially equal to the second angle β, similar to the first embodiment as shown in FIG. 5. Furthermore, the first and second ramps 134, 136 are mirror images of each other. It is to be appreciated that the ramps 134, 136 can be any suitable configuration. In addition, the aperture 130 is divided into a first portion 138 between the axis A and extending upwardly towards top end 200 the lever 124, and a second portion 140 between the axis A and extending downwardly towards the bottom end 202 of the lever 124.

The aperture 130 is further defined as having a first terminal end 142 and a second terminal end 144. The first and second ramps 134, 136 extend angularly from the contact surface 132 to the first and second terminal ends 142, 144 along the axis A, respectively. The ramps 134, 136 radially surround the axis A in one of a substantially arcuate configuration and a substantially angular configuration. More specifically, in the substantially arcuate configuration, the first and second ramps 134, 136 follow a substantially curved path around the axis A, as shown in FIG. 11B. In the substantially angular configuration, the first and second ramps 134, 136 follow a path around the axis A that is polygonal in configuration, as shown in FIG. 11A. The polygonal configuration is further defined as an octagonal configuration in the illustrated embodiment. It is to be appreciated that the ramps 134, 136 can radially surround the axis A in any other suitable configuration.

As shown in FIGS. 10-11B and 13, a first post 146 and a second post 148 extend from the lever 124 in opposite directions transverse to the axis A with each of the first and second posts 146, 148 extending to a distal end 150. More specifically, the lever 124 includes a first shoulder 151 and a second shoulder 153 with the first and second posts 146, 148 extending from the first and second shoulders 151, 153, respectively. Furthermore, the first bushing 52 is attached to the distal end 150 of the first post 146 and the second bushing 54 is attached to the distal end 150 of the second post 148. The first and second shoulders 151, 153 and the first and second bushings 52, 54 are substantially cylindrical in configuration. Furthermore, the first and second shoulders 151, 153 and the first and second bushings 52, 54 have a diameter with the diameter of the first and second shoulders 151, 153 less than the diameter of the first and second bushings 52, 54. The first and second posts 146, 148 define a square configuration extending from the lever 124. However, it is to be appreciated that the first and second posts 146, 148 may be a circle configuration or any other suitable configuration for coupling the first and second bushings 52, 54 to the lever 124. It is to be appreciated that in another embodiment the first and second posts 146, 148 and first and second bushings 52, 54 can be further defined as just one post and just one bushing. Furthermore, it is to be appreciated that in yet another embodiment the first and second posts 146, 148 and first and second bushings 52, 54 can be further defined as greater than two posts 146, 148 and greater than two bushings 52, 54.

As shown in FIG. 10 and similar to the first embodiment shown FIGS. 6C and 6D, the lever 124 further includes a protrusion 203 extending angularly from the bottom end 202 of the lever 124 towards a distal end in a direction substantially towards the top end 200 of the lever 124. The protrusion 203 further defines an orifice 155 at the distal end with a plunger 157. A biasing member (not shown) is disposed within the orifice 155. More specifically, the biasing member is completely disposed within the orifice 155 and the plunger 157 is partially disposed within the orifice 155. The biasing member and the plunger 157 abut each other, such that the biasing member biases the plunger 157 away from the bottom end 202 of the lever 124.

The shifter assembly 120 further includes the handle 156 defining an interior 158 with the handle 156 disposed over at least a portion of the lever 124. More specifically, the handle 156 is disposed over the top end 200 of the lever 124 and is rigidly secured to the lever 124.

As shown in FIG. 9, the shifter assembly 120 includes the support 122 secured to the vehicle. The support 122 can be secured to the vehicle by bolts, screws, pins, or any other suitable fasteners. The support 122 includes a first section 204 and a second section 206 with the first and second sections 204, 206 coupled to each other by any one of a bolt, pin, screw, or any other suitable fastener. The support 122 partially encompasses the lever 124. More specifically, the support 122 defines a hollow 208 with a portion of the lever 124 disposed within the hollow 208 of the support 122, as shown in FIG. 10.

Moreover, at least the bottom end 202 of the lever 124 is disposed within the support 122.

The lever 124 is coupled to the support 122. More specifically, the pin 60 is disposed within the hollow 208 of the support 122 and engages the support 122 within the hollow 208. More specifically, the pin 60 is disposed within the aperture 130 of the lever 124. As shown in FIGS. 12 and 13, the pin 60 engages the contact surface 132 of the lever 124 and engages one of the handle 156 and the support 122 to partially couple the lever 124 to the one of the handle 156 and the support 122. In this embodiment, the pin 60 engages the support 122. However, it is to be appreciated that the pin 60 can engage the handle 156, as discussed above, in other embodiments.

In this embodiment, the pin 60 is integral with the first section 204 of the support 122, as shown in FIG. 10. The second section 206 of the support 122 defines an opening 210 coaxial with the hole 62 of the pin 60 for receiving the fastener 68 to further couple the first section 204 to the pin 60 and the second section 206, as well as couple the lever 124 to the support 122. It is to be appreciated the fastener 68 can be any one of a bolt, screw, etc. The opening 210 further defines a counter-bore configuration for completely disposing the fastener 68 therein. Moreover, the fastener 68 extends through the opening 210 into the hole 62 of the pin 60 to secure the handle 156 to the pin 60, as shown in FIGS. 12 and 13. It is to be appreciated that the pin 60 can be a separate component from the first section 204 of the support 122 with the pin 60 disposed within the hollow 208 of the support 122 and coupled to the first and second sections 204, 206 of the housing. It is also to be appreciated that the pin 60 can be integral with the second section 206 of the housing and such that the first section 204 of the housing defines the opening 210 coaxial with the hole 62 of the pin 60 for receiving the fastener 68 to secure the first section 204 to the pin 60.

Similar to the first embodiment shown FIGS. 6C and 6D, the support 122 further includes a return device disposed within the hollow 208 of the support 122 adjacent the handle 156. The plunger 157 of the lever 124 engages the return device as described below.

As shown in FIGS. 11A, 11B, and 13, the shifter assembly 120 further includes a pair of first engagement surfaces 176 spaced from each other and a pair of second engagement surfaces 178 spaced from each other with the first and second engagement surfaces 176, 178 disposed on the one of the handle 156 and the support 122. In this embodiment, the first and second engagement surfaces 176, 178 are disposed on the support 122. However, it is to be appreciated that the first and second engagement surfaces 176, 178 can be disposed on the handle 156, as discussed above, in other embodiments. The pair of first and second engagement surfaces 176, 178 are disposed within the hollow 208 of the support 122 and are positioned such that the pair of first and second engagement surfaces 176, 178 are disposed on opposite sides of the hollow 208 of the support 122. Furthermore, the pair of first and second engagement surfaces 176, 178 are transverse to the pin 60 disposed within the hollow 208 of the support 122.

Each of the pair of first and second engagement surfaces 176, 178 have a first end 180 and a second end 182. The first ends 180 of the pair of first and second engagement surfaces 176, 178 are disposed away from handle 156 and the second ends 182 of the pair of first and second engagement surfaces 176, 178 are disposed toward the handle 156. Furthermore, each of the pair of first engagement surfaces 176 are substantially parallel to each other and each of the pair of second engagement surfaces 178 are substantially parallel to each other. In addition, the pair of first and second engagement surfaces 176, 178 are one of a linear configuration and a curvilinear configuration. More specifically, in the linear configuration, each of the pair of first and second engagement surfaces 176, 178 follow a linear path between the first end 180 and the second end 182 as shown in FIGS. 6A and 6B. In the curvilinear configuration, the pair of first and second engagement surfaces 176, 178 follow a curvilinear path between the first end 180 and the second end 182 that apexes away from the lever 124, as shown in FIGS. 11A and 11B. In this embodiment as shown in FIGS. 11A and 11B, the pair of first and second engagement surfaces 176, 178 are the curvilinear configuration. However, it is to be appreciated that the pair of first and second engagement surfaces 176, 178 can be any other suitable configuration.

As shown in FIG. 13, the first bushing 52 is sandwiched between the pair of first engagement surfaces 176 and the second bushing 54 is sandwiched between the pair of second engagement surfaces 178. More specifically, the first bushing 52 is disposed between and abuts each of the pair of first engagement surfaces 176. Similarly, the second bushing 54 is disposed between and abuts each of the pair of second engagement surfaces 178.

As shown in FIG. 13, the first shoulder 151 of the lever 124 is disposed between the pair of first engagement surfaces 176 of the support 122 and the second shoulder 153 of the lever 124 is disposed between the pair of second engagement surfaces 178 of the support 122. Under nominal deformation of the first and second bushings 152, 154, the first and second shoulders 151, 153 do not engage any one of the pair of first and second engagement surfaces 176, 178. When an excess load is exerted on the handle 156, the first and second bushings 52, 54 deform further until any one of the first and second shoulders 151, 153 engage any one of the pair of first and second engagement surfaces 176, 178, respectively. Engagement of the first and second shoulders 151, 153 with the pair of first and second engagement surfaces 176, 178, respectively, ensures that the first and second bushings 52, 54 do not continue to deform until any one of the bushings 52, 54 break or undergo, as it is known in the art, plastic deformation. Prevention of the breakage or plastic deformation of the first and second bushings 52, 54 ensures the function and longevity of the bushings 52, 54.

The pin 60 is rotatable towards the first and second ramps 134, 136 to define a first range of movement between the lever 124 and one of the handle 156 and the support 122, similar to the first range of movement of the first embodiment shown in FIG. 6B. In this embodiment, the first range of movement is between the lever 124 and the support 122. However, it is to be appreciated that the first range of movement can be between the lever 124 and the handle 156, as discussed above, in other embodiments. The first range of movement is further defined as the handle 156 pivoting relative to the support 122 to a left position and a right position. More specifically, the handle 156 is fixed to the lever 124 such that the handle 156 and the lever 124 pivot as a unit. In this embodiment, hereinafter any reference to the pivoting of the handle 156 refers to the concurrent pivoting of the handle 156 and the lever 124.

When the handle 156 pivots to the left position, the pin 60 rotates towards the first ramp 134 in the first portion 138 of the aperture 130 of the lever 124 and concurrently rotates towards the second ramp 136 in the second portion 140 of the aperture 130. When the handle 156 pivots to the right position, the pin 60 rotates towards the first ramp 134 in the second portion 140 of the aperture 130 of the lever 124 and concurrently rotates towards the second ramp 136 in the first portion 138 of the aperture 130.

In the substantially arcuate configuration of the first and second ramps 34, 36 as shown in FIG. 11A and similar to the first embodiment as shown in FIGS. 3A, 4, 6A, and 6B, the pin 60 has a diameter D and the terminal ends 142, 144 of the aperture 130 have a width W and a height H with the height H greater than or equal to the width W. More specifically, the width W is further defined as either one of the distance between the two opposing sides of the first terminal end 142 perpendicular to the axis A and the distance between the two opposing sides of the second terminal end 144 perpendicular to the axis A, along a horizontal plane defined by the axis A and the first and second posts 146, 148. For illustrative purposes, the plane of the cross-section shown in FIG. 13 is the same as the horizontal plane. As mentioned above, the first and second ramps 134, 136 extend angularly from the contact surface 132 to the first and second terminal ends 142, 144 along the axis A, respectively. Furthermore, the first and second ramps 134, 136 are mirror images of each other. As such, the width W of the first terminal end 142 is equal to the width W of the second terminal end 144.

The width W is transverse to the height H and both the width W and the height H are transverse to the axis A of the lever 24. As such, the height H is further defined as either one of the distance between the two opposing sides of the first terminal end 142 perpendicular to the axis A and the distance between the two opposing sides of the second terminal end 144 perpendicular to the axis A, along a vertical plane defined by the axis A and extending perpendicular to the horizontal plane. For illustrative purposes, the plane of the cross-section shown in FIG. 12 is the same as the vertical plane. As mentioned above, the first and second ramps 134, 136 are mirror images of each other. As such, the height H of the first terminal end 142 is equal to the height H of the second terminal end 144. It is to be appreciated that the width W could also be defined as one of the distance between the two opposing sides of the first ramp 134 perpendicular to the axis A and the distance between each of the two opposing sides of the second ramp 136 perpendicular to the axis A, along the horizontal plane. Moreover, the height H could also be defined as one of the distance between the two opposing sides of the first ramp 134 perpendicular to the axis A and the distance between each of the two opposing sides of the second ramp 136 perpendicular to the axis A, along the vertical plane.

The width W of the aperture 130 is substantially equal to the diameter D of the pin 60 such that the pin 60 only pivots along the height H during the first range of movement to reduce lash in the first range of movement between the lever 24 and the one of the handle 56 and the support 22. In this embodiment, lash is reduced between the lever 124 and the handle 156. However, it is to be appreciated that lash can be reduced between the lever 124 and the support 122, as discussed above, in other embodiments.

The first range of movement is further defined as one of relative rotation between the first and second posts 146, 148, respectively, and the first and second bushings 52, 54, respectively, and relative rotation between the first and second bushings 52, 54 and the pair of first and second engagement surfaces 176, 178, respectively, as the handle 156 pivots between the left and right positions. Moreover, as the handle 156 pivots between the left and right positions, the first and second bushings 52, 54 do not translate along the elongated pair of first and second engagement surfaces 176, 178. The square configuration of the first and second posts 146, 148 inhibits relative rotation between the first and second posts 146, 148 and the first and second bushings 52, 54, respectively. As such, relative rotation occurs between the first bushing 52 and the pair of first engagement surfaces 176 and between the second bushing 54 and the pair of second engagement surfaces 178. It is to be appreciated that in another embodiment in which the first and second posts 146, 148 are in the circle configuration, the first bushing 52 remains stationary between the pair of first engagement surfaces 176 while rotating relative to first post 146 and the second bushing 54 remains stationary between the pair of second engagement surfaces 178 while rotating relative to second post 148.

The sandwiching of the first bushing 52 between the pair of first engagement surfaces 176 and the sandwiching of the second bushing 54 between the pair of second engagement surfaces 178, as shown in FIG. 13, defines a second range of movement and fully couples the lever 124 to the one of the handle 156 and the support 122, similar to the second range of movement of the first embodiment shown in FIG. 6A. In this embodiment, the lever 124 is fully coupled to the support 122. However, it is to be appreciated that the lever 124 can be fully coupled to the handle 156, as discussed above, in other embodiments. The second range of movement is further defined as the handle 156 pivoting relative to the support 122 to a forward position and a rearward position. Moreover, the second range of movement is transverse to the first range of movement. More specifically, the second range of movement is perpendicular to the first range of movement. It is to be appreciated that the forward, rearward, left, and right positions can be any suitable configuration in which the second range of movement is transverse to the first range of movement.

As shown in FIGS. 10, 11A, and 11B, each of the pair of first and second engagement surfaces 176, 178 are elongated. As a result, the first and second bushings 52, 54 translate along the pair of first and second engagement surfaces 176, 178, respectively, during the second range of movement. More specifically, the first bushing 52 moves towards the first end 180 of the pair of first engagement surfaces 176 and the second bushing 54 moves towards the second end 182 of the pair of second engagement surfaces 178 when the handle 156 is pivoted to the forward position during the second range of movement. Similarly, the first bushing 52 moves towards the second end 182 of the pair of first engagement surfaces 176 and the second bushing 54 moves towards the first end 180 of the pair of second engagement surfaces 178 when the handle 156 is pivoted to the rearward position during the second range of movement.

The second range of movement is further defined as relative rotation between the pin 60 and the lever 124. More specifically, as the handle 156 pivots to one of the forward and rearward positions, the pin 60 remains stationary relative to the support 122 while the lever 124 rotates about the pin 60. It is to be appreciated that in another embodiment relative rotation can occur between the pin 60 and the support 122. More specifically, the pin 60 rotates relative to the support 122 while the pin 60 remains stationary within the aperture 130 of the lever 124.

As mentioned above, the support 122 partially encompasses the lever 124 and the handle 156 is fixed to the lever 124 such that the handle 156 and the lever 124 pivot as a unit to any one of the forward, rearward, left, and right positions relative to the support 122. More specifically, the handle is initially positioned in an intermediate position between the left and right positions and the forward and rearward positions, as shown FIGS. 11A and 11B. Furthermore, in this embodiment the handle is biased to the intermediate position. However, it is appreciated that the handle could lack a bias to the intermediate position. It is to be appreciated that the handle 156 can be pivoted to any position between the forward, rearward, left, and right positions. More specifically, the handle 156 can pivot to a resultant position disposed within the angles between the forward and right positions, the right and rearward positions, the rearward and left positions, and the left and forward positions. When pivoted to the resultant position, the handle 156 pivots relative to the support 122 in a combination of the first and second range of movements.

As mentioned above, the plunger 157 of the lever 124 engages the return device of the support 122 in a similar manner to the first embodiment shown FIGS. 6C and 6D. When the user releases the handle 156, the bias exerted by the biasing member of the lever 124 on the plunger 157 causes the plunger 157 to translate away from the lever 124. The return device causes the handle 156 and the lever 124 to concurrently pivot towards the intermediate position.

As shown in FIG. 9, the support 122 defines a gate channel 212 through which the lever 124 extends from the hollow 208 of the support 122 to outside of the support 122. The gate channel 212 defines specific paths for the handle 156 as the handle 156 pivots between the forward, rearward, left, and right positions. In the present embodiment, the gate channel 212 is configured in an "H" configuration. Such configurations are well known in the art wherein each of the branches of the "H" correspond to one of a "First," "Second," "Third," and "Fourth" gears of the transmission of the vehicle with the crossbar of the "H" corresponding to a "Neutral" gear of the transmission as is commonly utilized in vehicles with a standard transmission. Furthermore, each of the branches of the "H" could correspond to one of a "Park," "Reverse," "Neutral," and "Drive" gears of the transmission as is commonly utilized in vehicles with an automatic transmission. It is to be appreciated that the gate channel 212 may be any suitable configuration for selecting any suitable gear of the transmission.

In a preferred alternative, the aperture 130 is defined explicitly by the lever 124, as shown in FIG. 11A. In other words, the lever 124 lacks the bore 92, as described in the first embodiment, into which the liner 94 is inserted. In this alternative, the ramps 134, 136 surround the axis A in the substantially angular configuration. However, it is to be appreciated that the ramps 134, 136 can radially surround the axis A in the substantially arcuate configuration or any other suitable configuration.

It is to be appreciated that in another alternative, the lever 124 defines a bore 192 in which the liner 94 is disposed, as shown in FIG. 11B. In this alternative, the ramps 134, 136 surround the axis A in the substantially arcuate configuration. However, it is to be appreciated that the ramps 134, 136 can radially surround the axis A in the substantially angular configuration or any other suitable configuration.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A shifter assembly for selecting one of a plurality of gears of a transmission of a vehicle, said shifter assembly comprising:
a support;
a lever coupled to said support with said lever defining an aperture and an axis extending through said aperture with said lever having a contact surface disposed within said aperture, and a first ramp extending angularly from said contact surface and a second ramp extending angularly from said contact surface in an opposite direction from said first ramp;
a handle defining an interior with said handle disposed over at least a portion of said lever;
a pin engaging said contact surface of said lever and engaging one of said handle and said support to partially couple said lever to said one of said handle and said support with said pin rotatable towards said first and second ramps to define a first range of movement between said lever and one of said handle and said support;
a first post and a second post extending from said lever in opposite directions transverse to said axis with each of said first and second posts extending to a distal end;
a first bushing attached to said distal end of said first post and a second bushing attached to said distal end of said second post; and
a pair of first engagement surfaces spaced from each other and a pair of second engagement surfaces spaced from each other with said first and second engagement surfaces disposed on said one of said handle and said support, and said first bushing sandwiched between said pair of first engagement surfaces and said second bushing sandwiched between said pair of second engagement surfaces to define a second range of movement and to fully couple said lever to said one of said handle and said support.

2. A shifter assembly as set forth in claim 1 wherein each of said pair of first and second engagement surfaces are elongated with said first and second bushings translating along said pair of first and second engagement surfaces, respectively, during said second range of movement.

3. A shifter assembly as set forth in claim 1 wherein each of said first and second bushings include at least one void such that said first bushing at least partially deforms when sandwiched between said pair of first engagement surfaces and said second bushing at least partially deforms when sandwiched between said pair of second engagement surfaces to reduce lash between said lever and said one of said handle and said support.

4. A shifter assembly as set forth in claim 1 wherein said first ramp and said axis form a first angle and said second ramp and said axis form a second angle with said first angle substantially equal to said second angle.

5. A shifter assembly as set forth in claim 1 wherein said first and second ramps are mirror images of each other.

6. A shifter assembly as set forth in claim 1 wherein said contact surface is disposed at a central position within said aperture of said lever.

7. A shifter assembly as set forth in claim 1 wherein said first range of movement is further defined as said handle pivoting relative to said support to a left position and a right position and said second range of movement is further defined as said handle pivoting relative to said support to a forward position and a rearward position with said second range of movement transverse to said first range of movement.

8. A shifter assembly as set forth in claim 7 wherein said first range of movement is further defined as one of relative rotation between said first and second posts and said first and second bushings, respectively, and relative rotation between said first and second bushings and said pair of first and second engagement surfaces, respectively, as said handle pivots between said left and right positions.

9. A shifter assembly as set forth in claim 7 wherein each of said pair of first and second engagement surfaces have a first end and second end with said first bushing moving towards said first end of said pair of first engagement surfaces and said second bushing moving towards said second end of said pair of second engagement surfaces when said handle is pivoted to said forward position during said second range of movement, and with said first bushing moving towards said second end of said pair of first engagement surfaces and said second bushing moving towards said first end of said pair of second engagement surfaces when said handle is pivoted to said rearward position during said second range of movement.

10. A shifter assembly as set forth in claim 7 wherein said lever has a base with said base fixed to said support and said handle pivots to any one of said forward, rearward, left, and right positions relative to said lever.

11. A shifter assembly as set forth in claim 7 wherein said support partially encompasses said lever and said handle is fixed to said lever such that said handle and said lever pivot as a unit to any one of said forward, rearward, left, and right positions relative to said support.

12. A shifter assembly as set forth in claim 1 wherein said aperture is further defined as having a first terminal end and a second terminal end with said first and second ramps extending angularly from said contact surface to said first and second terminal ends along said axis, respectively, with said ramps radially surrounding said axis in one of a substantially arcuate configuration and a substantially angular configuration.

13. A shifter assembly as set forth in claim 12 wherein said pin has a diameter and said terminal ends of said aperture have a width and a height with said height greater than or equal to said width and said width transverse to said height and both said width and said height being transverse to said axis of said lever, said width being substantially equal to said diameter such that said pin only pivots along said height during said first range of movement to reduce lash in said first range of movement between said lever and said one of said handle and said support.

14. A shifter assembly as set forth in claim 1 wherein said pin defines a hole extending through said pin and said handle includes a lower portion defining a pair of openings coaxial with said hole for receiving a fastener to secure said handle to said pin.

15. A shifter assembly as set forth in claim 1 wherein said pair of first and second engagement surfaces are one of a linear configuration and a curvilinear configuration.

16. A shifter assembly for selecting one of a plurality of gears of a transmission of a vehicle, said shifter assembly comprising:
a support;
a lever coupled to said support and defining a bore;
a handle defining an interior with said handle disposed over at least a portion of said lever;
a pin engaging one of said handle and said support; and
said lever further including a liner mounted within said bore of said lever with said liner defining an aperture and having a contact surface disposed within said aperture, and a first ramp extending angularly from said contact surface and a second ramp extending angularly from said contact surface in an opposite direction from said first ramp with said pin engaging said contact surface and selectively engaging said first and second ramps to define a range of movement between said lever and said one of said handle and said support.

17. A shifter assembly as set forth in claim 16 wherein said pin radially displaces said contact surface of said liner to reduce lash between said pin and said liner.

18. A shifter assembly as set forth in claim 16 wherein said liner defines a cavity adjacent said contact surface to facilitate displacement of said contact surface.

19. A shifter assembly as set forth in claim 16 wherein said lever further includes a first retaining feature and said liner includes a second retaining feature with said first and second retaining features engaging each other to couple said liner to said lever.

20. A shifter assembly as set forth in claim 16 wherein said lever has a first anti-rotation feature and said liner has a second anti-rotation feature with said first and second anti-rotation features engaging each other to prevent rotation of said liner within said bore of said lever.

21. A shifter assembly as set forth in claim 16 wherein said first and second ramps are mirror images of each other.

22. A shifter assembly as set forth in claim 16 wherein said contact surface is disposed at a central position within said aperture of said liner.

* * * * *